United States Patent [19]

Dewan

[11] 3,897,684

[45] Aug. 5, 1975

[54] PERMANENT MAGNET TYPE E.M. CURRENT METERS

[75] Inventor: Rajinder N. Dewan, Suitland, Md.

[73] Assignee: The United States of America as represented by the Secretary of the Navy, Washington, D.C.

[22] Filed: Mar. 25, 1974

[21] Appl. No.: 454,505

[52] U.S. Cl. .......................................... 73/194 EM
[51] Int. Cl.² ........................................... G01P 5/08
[58] Field of Search .............. 73/194 EM, 181, 189; 324/34 FL

[56] References Cited
UNITED STATES PATENTS

| | | | |
|---|---|---|---|
| 1,249,530 | 12/1917 | Smith et al. | 73/181 |
| 3,736,798 | 6/1973 | Wood et al. | 73/194 EM |
| 3,759,097 | 9/1973 | Cushing | 73/194 EM |

*Primary Examiner*—Charles A. Ruehl
*Attorney, Agent, or Firm*—R. S. Sciascia; Arthur L. Branning; M. L. Crane

[57] ABSTRACT

This disclosure makes use of a permanent magnet probe to measure fluid flow and provides means for depolarizing the electrodes used therewith.

2 Claims, 3 Drawing Figures

PERMANENT MAGNET TYPE E.M. CURRENT METERS

BACKGROUND OF THE INVENTION

This invention relates to ocean current flow measurements and more particularly to a permanent magnet type fluid current flow measuring device.

Electromagnetic and permanent magnet flow current meters measure the velocity of a conducting fluid by detecting the potential developed as the fluid moves through a magnetic field. The potential is sensed by at least two electrodes placed opposite each other in the magnetic field. The detected voltage is proportional to the flow velocity in an area across the magnetic field.

Heretofore electromagnetic and permanent magnet type flow current meters have been used, one of which has been set forth in U.S. Pat. No. 3,736,798. The prior art devices have built-in difficulties, the electromagnet type produces an additional voltage in the electrode circuit due to the transformer effect. This produces an output which is not flow related. In the permanent magnet type, the electrodes become polarized, therefore they do not accurately measure the current flow. The present invention overcomes the drawbacks of the prior art and permits accurate measurement by use of a permanent magnet. As compared to electromagnetic, the permanent magnet type flow current meter has a much simpler signal processing electronic circuitry.

SUMMARY OF THE INVENTION

This device measures ocean flow current in water by use of two pairs of electrodes placed at right angles to each other in a magnetic field produced by a permanent magnet. Polarization of the electrodes is prevented by exciting the electrodes with a square wave electrical current and taking current flow measurements of the water during intervals of zero bias.

It is therefore an object of the invention to provide a current flow measuring device which will measure current flow over a long period of time without detrimental effects due to polarization of the detector electrodes.

DESCRIPTION

Figure 1:
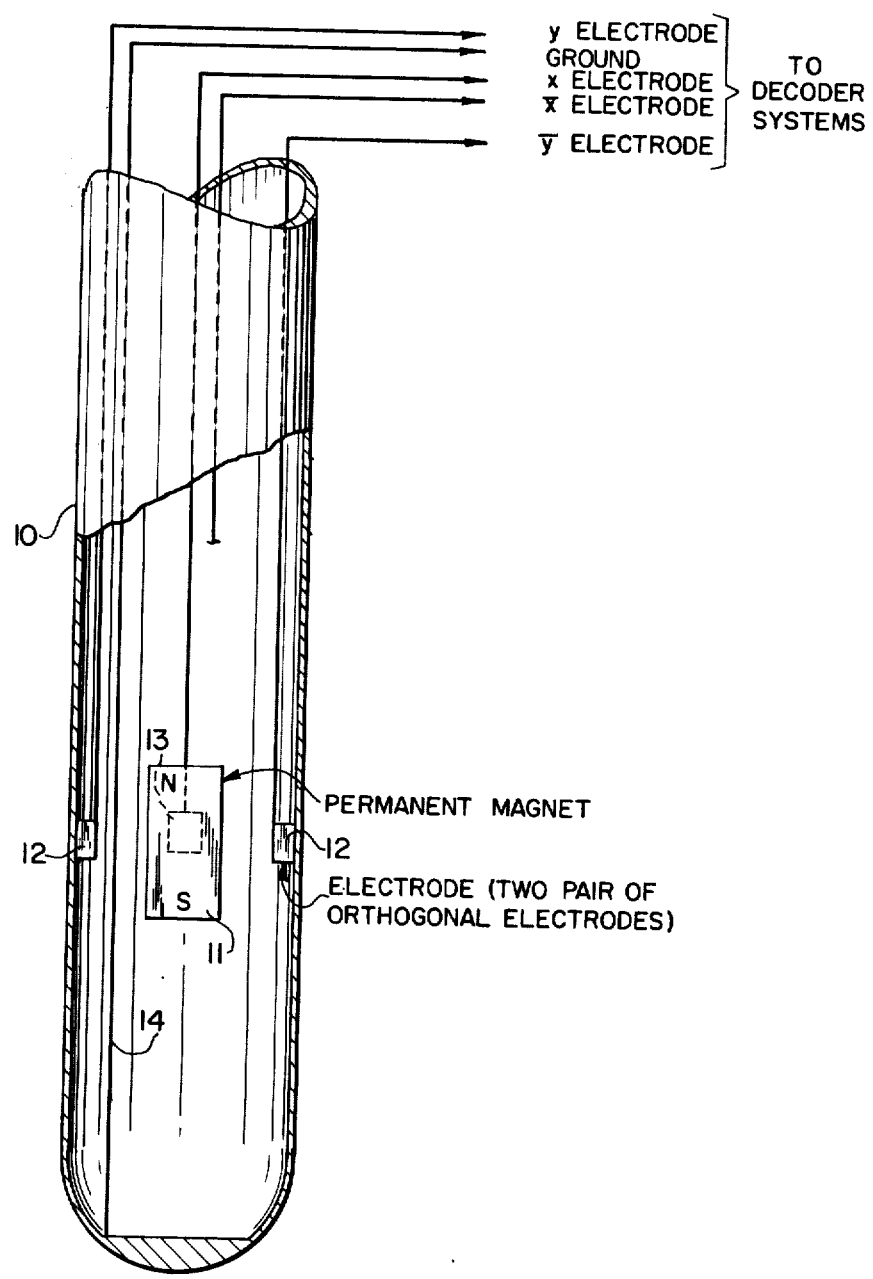
FIG. 1 is a partial view of the probe with a schematic of the electrical circiutry in combination therewith.

Now referring to the drawings, there is shown by illustration a partial view of a flow current measuring probe with the attendant electrical circuitry. As shown, the probe includes a housing 10 made of a nonferromagnetic material such as plastic which encloses a cylindrical permanent magnet 11 positioned within the housing with the long axis coaxial with the long axis of the housing. On a mid-plane normal to the long axis of the permanent magnet is located two pairs 12,13 of orthogonally disposed electrodes which are secured to the inner wall of the housing. A ground wire 14 extends through the probe and is grounded at the bottom of the probe. Each of the electrode pairs are connected electrically to a detector 16A,16B the output of which is fed into an amplifier 17A,17B which amplifies the potential developed between opposite electrodes and directs the output into a suitable output meter or recorder 18A,18B which indicates the current flow velocity measurement.

Figure 2:
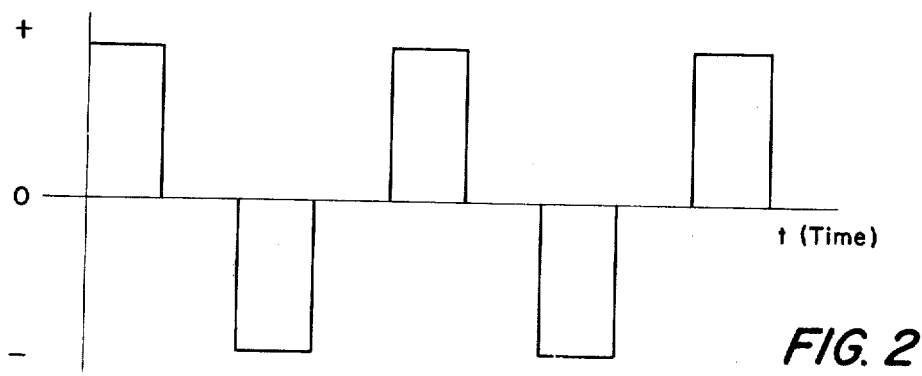
FIG. 2 illustrates the square wave by which the electrodes are depolarized.
Figure 3:
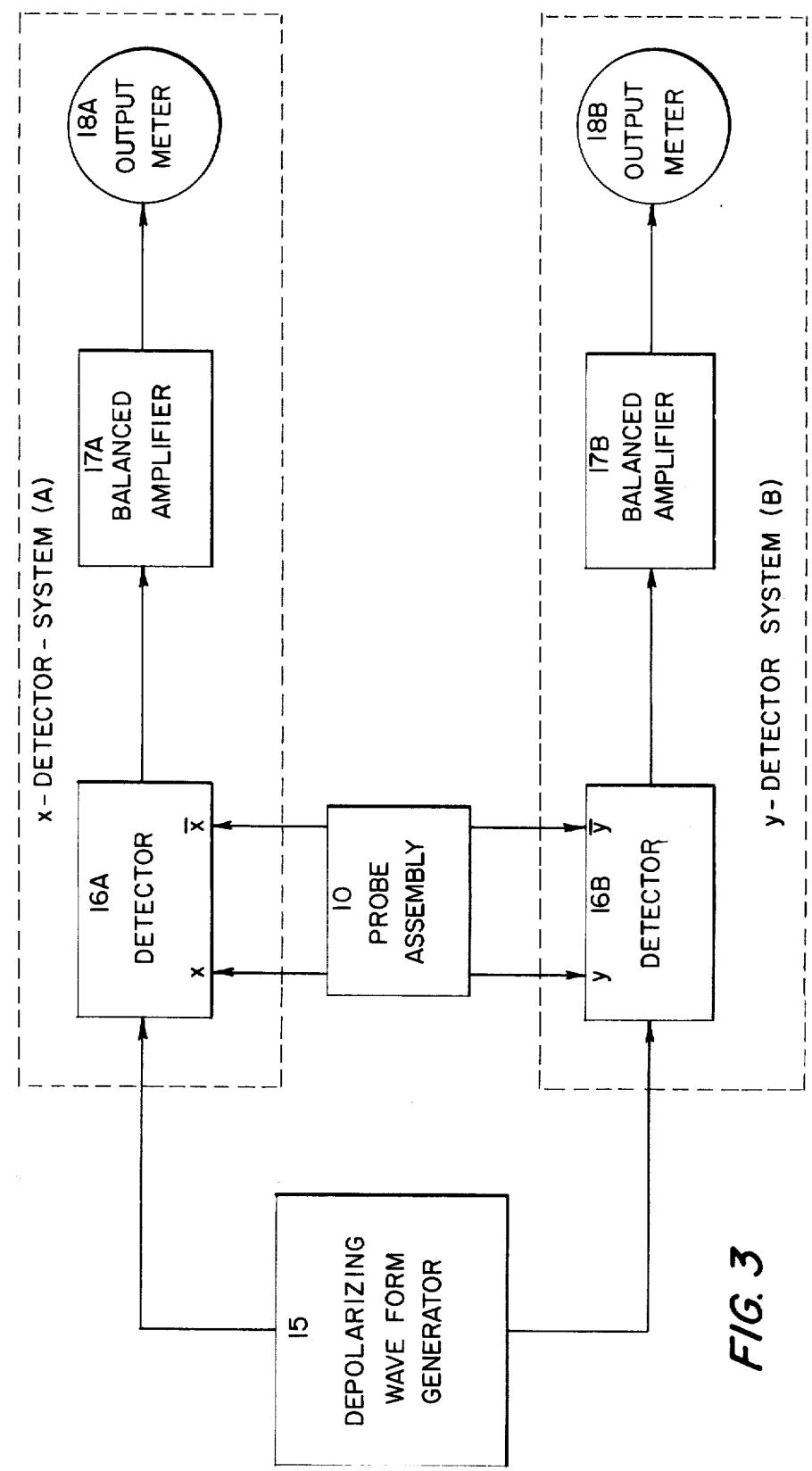
FIG. 3 illustrates the detector electronic circuitry.

In order to prevent polarization of the electrodes, an alternating square wave such as shown in FIG. 2 is applied to the electrodes through the detectors 16A,16B by a suitable depolarizing waveform generator 15 which depolarizes the electrodes. A suitable square waveform generator being a model 201 -202 purchased from Exact Electronics, 455 South East Second Street, Hillsborough, Oreg. 97123. As shown, the square wave has a period of zero bias during which time electrode potential measurements are made and shown by the output meter. Other waveforms beside the one shown can also be used.

The detector blocks 16A, 16B switching matrixes are formed by well known off the shelf logic gates, switching gates, and internal clock slaved to the depolarizing wave form generator 15 for sequencing of the gates.

The switching matrixes will permit the outputs $x, \overline{x}$ & $y, \overline{y}$ from probe 10 to be connected to the balanced amplifiers 17A, 17B and the depolarizing wave form generator 15 to be disconnected from probe 10 during a period of zero bias (no depolarization potential) from the depolarizing wave form generator 15. Similarly, the switching matrixes will disconnect the outputs $x, \overline{x}$ & $y$, $\overline{y}$ from probe 10 to the balanced amplifiers 17A, 17B and connect the depolarizing wave form generator 15 to probe 10 during the periods of depolarization.

In assembling the probe, the permanent magnet is positioned such that the magnetic field or flux lines developed are perpendicular to the direction of current flow and the electrodes are on the midplane of the magnet with the pairs orthogonally disposed.

In operation, an alternating square wave such as represented in FIG. 2 is applied to the pairs of electrodes. The probe is positioned such that the lines of flux of the magnetic field are perpendicular to the flow current. The measurement of current flow is determined by the potential developed between the electrodes due to the water's current passing across the magnetic field. The output of the sensor or detector is proportional to $\vec{V} \times \vec{B}$, where $\vec{V}$ is the velocity of the fluid and $\vec{B}$ is the magnetic field strength. The magnet is a permanent magnet therefore the field strength remains the same. Since the magnetic field strength remains the same, then any change in fluid velocity will be indicated by the sensor or detector. Since the electrodes are biased by an alternating square wave current to depolarize the electrodes, electrode potential measurements by the sensor are only made during intervals of zero bias of the square wave applied to the electrodes.

Since a permanent magnet is used there is no requirement for a power source for producing a magnetic field. The power drain required to produce a square wave on the electrodes is much less than that which would be required to produce the magnetic field, therefore much less power will be consumed by operation of the present device. Since less power is used, a self-contained flow current meter such as set forth above may be left unattended for long periods of time, if used for remote flow current sensing.

Obviously many modifications and variations of the present invention are possible in light of the above teaching. It is therefore to be understood that within

What is claimed and desired to be secured by Letters Patent of the United States is:

1. A permanent magnetic fluid stream flow meter which comprises:
   an elongated housing made of nonferromagnetic material;
   a permanent bar magnet secured within said housing with its long axis coaxial with said housing such that its magnetic lines of flux are perpendicular to the direction of fluid flow to be measured;
   at least one pair of oppositely disposed electrodes symmetrically positioned about said permanent magnet and so positioned to be in electrical contact with the fluid to be measured;
   a square wave generator means for periodically applying a square wave current to said electrodes with periods of zero bias on said electrodes; and
   electrical potential detector means for measuring a potential between said electrodes produced by fluid flow across said magnetic lines of flux during zero bias on said electrodes which is representative of the fluid flow.

2. A permanent magnetic fluid stream flow meter as claimed in claim 1, wherein;
   said flow meter includes two pair of orthogonally disposed electrodes.

* * * * *